United States Patent [19]

Locher et al.

[11] 4,219,000

[45] Aug. 26, 1980

[54] CONTROL DEVICE FOR SELECTABLE SPEEDS IN INTERNAL COMBUSTION ENGINES

[75] Inventors: Johannes Locher, Stuttgart; Helmut Domann, Leonberg, both of Fed. Rep. of Germany

[73] Assignee: Robert Bosch GmbH, Stuttgart, Fed. Rep. of Germany

[21] Appl. No.: 894,211

[22] Filed: Apr. 6, 1978

[30] Foreign Application Priority Data

Apr. 6, 1977 [DE] Fed. Rep. of Germany ....... 2715408

[51] Int. Cl.[2] ......................... F02D 1/12; B60K 31/00

[52] U.S. Cl. .................................... 123/357; 123/333; 180/170

[58] Field of Search ............... 123/140 R, 139 E, 102, 123/32 EE, 32 EA, 117 R; 180/105 E; 60/276, 285

[56] References Cited

U.S. PATENT DOCUMENTS

| | | | |
|---|---|---|---|
| 3,533,236 | 10/1970 | Cottington | 123/102 |
| 3,630,177 | 12/1971 | Engel | 123/139 E |
| 3,827,409 | 8/1974 | O'Neill | 123/139 E |
| 3,875,907 | 4/1975 | Wessel et al. | 60/276 |
| 3,915,130 | 10/1975 | Hobo et al. | 123/139 E |
| 3,998,191 | 12/1976 | Beyerlein et al. | 123/102 |
| 4,084,659 | 4/1978 | Abend et al. | 123/102 |
| 4,098,367 | 7/1978 | Fleischer | 123/102 |
| 4,117,903 | 10/1978 | Fleischer et al. | 180/105 E |

*Primary Examiner*—P. S. Lall
*Attorney, Agent, or Firm*—Edwin E. Greigg

[57] ABSTRACT

A control device for internal combustion engines serves to maintain selectable speeds at a constant value. The control device comprises an actual value-desired value comparison stage for the speed, at least one integrator, as well as storage capacity for the integrator value. The engine has a speed device and within a selectable speed range of the engine, the speed device operates in accordance with its function. Outside of the selected speed range, particularly at higher speeds, the integrator serves as a storage device so that when the speed again enters the control speed range, the stored value serves as a starting point for the renewed control operation. In this way, a rapid control action is insured upon each re-entry into the control range, besides providing an exact control operation within the range.

21 Claims, 2 Drawing Figures

CONTROL DEVICE FOR SELECTABLE SPEEDS IN INTERNAL COMBUSTION ENGINES

BACKGROUND OF THE INVENTION

The idling governors customary nowadays, especially in diesel engines, control the idling speed of the engine with the use of a proportional controller, i.e., in the case of excessive or high idle speeds, less fuel is injected, resulting in torque reduction and, in the case of low idle speeds, more fuel is injected to increase the torque. On account of the differing frictional torques in a cold engine as opposed to a hot engine, and on account of a different torque delivery needed during idling for driving auxiliary units (for example the air conditioner), the idling speed changes, since a change in torque always entails a change in speed. Servo controls for use in conjunction with control units are known, which, for example in dependence on engine temperature, vary the feedback over the speed. This does not, however, result in a constant idling speed, especially since proportional controllers always exhibit certain control deviations. From the field of control technology it is known to eliminate these control deviations by imparting to the controller an integral-proportional behavior. With a closed control circuit, the integral portion of the controller resets the correcting variable unitl the actual speed is equal to the desired speed, i.e., the control deviation has been reduced to zero.

This solution per se, however, cannot be employed in an idling governor since the instantaneous speed during the driving operation is higher than the desired idling speed of the idling control circuit. If an integral controller were used, the result would be that the deviations from the idling speed would be constantly summed up, which, when reentering the idling control range, would effect an instantaneous setting to an idling speed which would be too low. This could result in stalling of the engine.

OBJECT AND SUMMARY OF THE INVENTION

It is a principle object of the invention to provide a control device which does not have the above-noted disadvantages. Such a control device comprises at least one integrator which operates within a selected speed range.

The control device of this invention has the advantage that the favorable features of an integral controller can be exploited for idling control, while this integral controller does not interfere during the driving operation.

It has proven to be especially advantageous to store the integrator value outside of the selected speed ranges and to make this stored integrator value the starting point of the renewed speed control operation when the speed values reenter the selected range. This new starting point of the speed control then makes it possible to adjust more rapidly to the desired speed.

While the arithmetic sign of the desired-actual value deviation of the speed determines the integration direction, the integrating procedure as such can be selected in dependence on the position of the accelerator pedal and/or on a speed threshold.

The control device can be realized in any number of ways. It is especially advantageous to utilize as the integrator an Up/Down pulse counter since it can serve at the same time as a storage means for the integrator value. However, analog electrical storage means can also be utilized as the integrator. For example, a capacitor can be used, although in this case the storage feature requires special attention in view of the constance of the stored voltage. Finally, hydraulic or pneumatic integrators are also possible, as well as electromechanical integrators, for example, with the aid of servo motors.

The control characteristic of the control device can likewise be varied. Thus, basically, a pure integral controller can be utilized, or also a proportional-integral controller having the advantage of a smoother control operation; however, in addition, PID controllers can likewise be used.

DESCRIPTION OF THE PREFERRED EMBODIMENT

Figure 1:
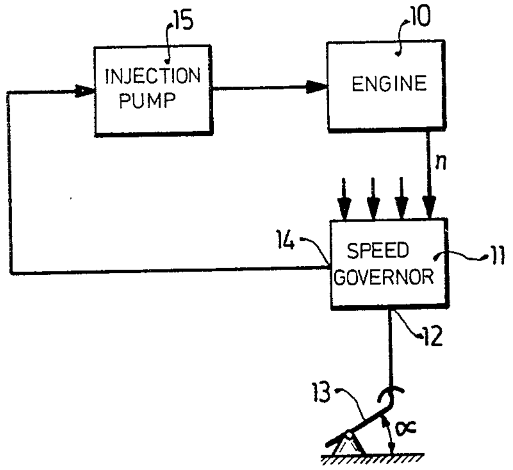
FIG. 1 is a block diagram for controlling a compression-ignition internal combustion engine.

FIG. 1 shows an internal combustion engine 10, a general speed governor 11 receiving, inter alia, a signal from the accelerator pedal 13 by way of an input 12. An output 14 of the speed governor 11 is connected to an injection pump 15 which, in turn, feeds fuel to the internal combustion engine 10.

Figure 2:
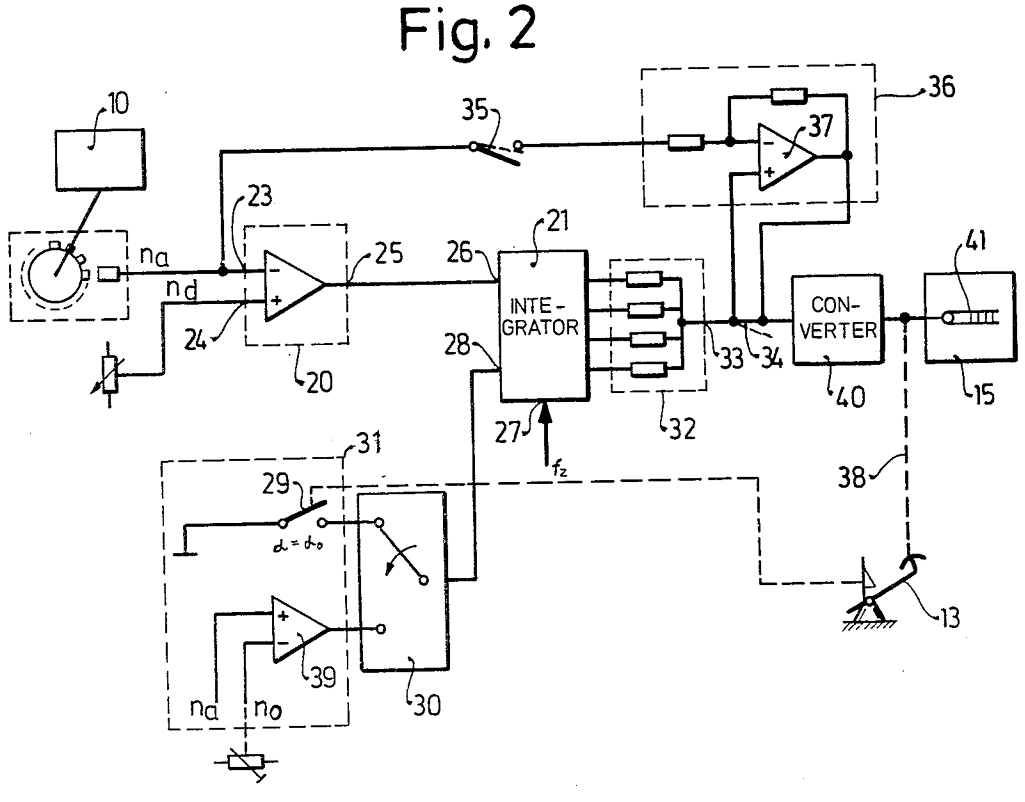
FIG. 2 is a block diagram of the control device according to the invention.

The essential parts of FIG. 2 are an actual speed value-desired speed value comparison stage 20, an integrator 21, and a voltage-displacement converter 40 coupled on its output side with a control rod 41 of the injection pump 15. In detail, the circuit has the following structure: The actual speed value-desired speed value comparison stage 20 has two inputs 23 and 24 through which the actual speed value ($n_a$) and the desired speed value ($n_d$) are applied. On the output side 25, the actual speed value-desired speed value comparison stage is connected to an integration direction input 26 of the integrator 21. The integrator 21 has a further input 27, through which a counting frequency fz is applied to the integrator, and a start-stop input 28. To this start-stop input 28 a signal from a command signal source 31 is applied. In one instance the command signal is dependent on the position of the accelerator pedal, and can be applied by way of a switch 29. In another instance the command signal is derived from a comparison stage 39, which compares the actual speed value ($n_a$) with a preselectable speed value ($n_o$). The possibility of signal selection is shown by a doublethrow switch 30. The integrator 21 proper is followed by a digital-voltage converter 32, the output 33 of which leads to a switch 34. In the illustrated switching position, the output 33 of the digital-voltage converter 32 is directly connected to the voltage-displacement converter 40, so that the control device exhibits a pure integral characteristic.

When the switch 34 is in the position shown in dashed lines, the control device has a PI characteristic, since in such a case, in addition to the integrator, a proportional controller 36 with an amplifier 37 is included in the control device.

The control device operates as follows: The switch 29 is to be closed, for example, during idling ($\alpha=\alpha_o$). In the illustrated switching position of switch 30, a zero signal is then applied to the start-stop input 28 of the integrator 21. This signal sets the integrator 21 into operation. Depending on the arithmetic sign of the actual speed value-desired speed value difference, a positive or negative signal appears at the integration direction input 26 of the integrator 21, whereby the integrator 21 counts upwardly or downwardly, or integrates, with a counting frequency dependent on the counting frequency $f_Z$. The voltage value at the output 33 of the digital-voltage converter 32 varies correspondingly, and thus the control rod 41 also changes its position by way of the voltage-displacement converter 40.

Upon a change in the position of the accelerator pedal, the switch 29 is opened and thereby stops the integrating operation in the integrator 21. However, the digital value thereof remains in storage. In this way the position of a control member at the output of the voltage-displacement converter 40 remains preserved; the control rod 41 proper can now (above idling) be adjusted at will by way of a now dominant operative connection 38 with the accelerator pedal 13.

The other type of control available by means of the switch 30 makes it possible to effect a start-stop control of the integrator 21 in dependence on the actual speed as compared to a freely selectable speed ($n_o$). The mode of operation of the control device is not changed thereby. A combination of speed threshold and accelerator pedal position when forming a start-stop signal for the integrator is also possible and may be realised with an OR-Gate instead of the switch 30.

If the switches 34 and 35 are in the position shown in dashed lines, a proportional feature is added to the integral characteristic of the control device by way of the proportional controller 36. This change in the control behavior has no influence on the integrating behavior of the integrator 21 and on the storage of the integrator value.

In addition to the illustrated groups of components, it is also possible to incorporate a further group of components to produce a D portion, and thus to realize a PID controller.

FIG. 2 shows a system which operates purely electrically. To produce hydraulic, pneumatic, or electromechanic systems, it is merely necessary to replace the respective groups of components by components having an equivalent function.

For reasons of stability, the resetting time of the integral controller must be large as compared to other time elements in the control circuit. This also makes the correction time long. By storing the heretofore correct setting variable, the latter is always in the proximity of the correct value, even if the controller cannot achieve balancing, such as during the driving operation, for example.

What is claimed is:

1. In a control device for internal combustion engines, the improvement comprising: an integrator; and means for switching the integrator out of its operative state whenever the engine speed is outside of a selected speed range, said control device serving to maintain its final control state intact whenever the integrator is switched out of its operative state.

2. In the control device according to claim 1, wherein the integrator is such that it stores its output value when it is switched out of its operative state by the switching means and retains the stored value upon being switched into its operative state.

3. In the control device according to claim 2 wherein the integrator comprises an UP/DOWN counter.

4. In the control device according to claim 2, wherein the integrator comprises a capacitor.

5. In the control device according to claim 1, the improvement further comprising: a comparator for comparing the actual engine speed value to the desired speed value and providing an output signal which is applied to said integrator, wherein the arithmetic sign of the comparator output determines the direction of integration, and wherein the switching means is accelerator pedal actuated.

6. In the control device according to claim 1, the improvement further comprising: a comparator for comparing the actual engine speed value to the desired speed value and providing an output signal which is applied to said integrator, wherein the arithmetic sign of the comparator output determines the direction of integration, and wherein the switching means is actuated by a freely selectable threshold speed signal.

7. In the control device according to claim 1, the improvement further comprising: a comparator for comparing the actual engine speed value to the desired speed value and providing an output signal which is applied to said integrator, wherein the arithmetic sign of the comparator output determines the direction of integration, and wherein the switching means is actuated by the accelerator pedal and by a freely selectable threshold speed signal.

8. In the control device according to claim 1, wherein the integrator and switching means are hydraulic components.

9. In the control device according to claim 1, wherein the integrator and switching means are pneumatic components.

10. In the control device according to claim 1, wherein the integrator and switching means are electromechanical components.

11. In the control device according to claim 1, the improvement further comprising: A proportional controller connected to the output of the integrator.

12. In the control device according to claim 1, the improvement further comprising: a derivative controller connected to the output of the integrator.

13. In the control device according to claim 1, the improvement further comprising; a proportional controller; and a derivative controller connected together and to the output of the integrator.

14. In a control device for controlling the fuel supply to an internal combustion engine, the improvement comprising:

an integrator having an integration direction input, a start-stop input, a coupling frequency input and an output;

a comparator for generating an actual value-desired value speed signal which is applied to the integration direction input;

a switch connected to the start-stop input and to a command signal source for applying a start-stop signal to the start-stop input; and converter means connected to the output of said integrator for converting the integrator output to a setting position for use in controlling the fuel supply.

15. In the control device according to claim 14, wherein the integrator is such that it stores its output value when it is switched out of its operative state by said switch and retains the stored value upon being switched into its operative state.

16. In the control device according to claim 14, wherein the integrator comprises an UP/DOWN counter.

17. In the control device according to claim 14, wherein the command signal source comprises an accelerator pedal controlled switch.

18. In the control device according to claim 14, wherein the command signal source comprises a comparator for generating an actual value-selectable value speed signal.

19. In the control device according to claim 14, wherein the converter means includes a digital-voltage converter and a voltage-displacement converter connected in series.

20. In the control device according to claim 14, wherein the improvement further comprises:

a proportional controller; and switch means for connecting the proportional controller to the converter means.

21. In the control device according to claim 14, wherein the converter means includes a digital-voltage converter and a voltage-displacement converter, and wherein the improvement further comprises:

a proportional controller; and switch means for connecting in one position the proportional controller, the digital-voltage converter and voltage-displacement converter in series, and for connecting in another position the digital-voltage converter and the voltage-displacement converter in series.

* * * * *